United States Patent
Zheng et al.

(10) Patent No.: US 10,082,773 B2
(45) Date of Patent: Sep. 25, 2018

(54) FORMULATING STEADY-STATE TARGETS USING PRIORITIZED OBJECTIVE FUNCTIONS

(71) Applicant: ASPEN TECHNOLOGY, INC., Bedford, MA (US)

(72) Inventors: Qingsheng Quinn Zheng, Sugar Land, TX (US); Michael R. Keenan, Sugar Land, TX (US); Lucas L. G. Reis, Houston, TX (US); Subhash Ghorpade, Houston, TX (US); Magiel J. Harmse, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 263 days.

(21) Appl. No.: 15/138,752

(22) Filed: Apr. 26, 2016

(65) Prior Publication Data

US 2016/0320770 A1    Nov. 3, 2016

Related U.S. Application Data

(60) Provisional application No. 62/155,346, filed on Apr. 30, 2015.

(51) Int. Cl.
*G05B 19/408* (2006.01)
*G05B 13/04* (2006.01)
*G05B 17/02* (2006.01)

(52) U.S. Cl.
CPC ......... *G05B 13/042* (2013.01); *G05B 13/048* (2013.01); *G05B 17/02* (2013.01)

(58) Field of Classification Search
CPC ..... G05B 13/042; G05B 17/02; G05B 13/048
See application file for complete search history.

(56) References Cited

U.S. PATENT DOCUMENTS

| | | | |
|---|---|---|---|
| 6,278,899 B1* | 8/2001 | Piche ............ | G05B 13/048 375/316 |
| 6,381,504 B1* | 4/2002 | Havener .......... | G05B 13/048 700/28 |

(Continued)

FOREIGN PATENT DOCUMENTS

WO    WO2016/176214 A1    11/2016

OTHER PUBLICATIONS

International Preliminary Report on Patentability for PCT/US2016/029379 dated Oct. 31, 2017 entitled "Formulating Steady-State Targets Using Prioritized Objective Functions".

(Continued)

*Primary Examiner* — Ramesh Patel
(74) *Attorney, Agent, or Firm* — Hamilton, Brook, Smith & Reynolds, P.C.

(57) ABSTRACT

Computer system and methods for optimally controlling the behavior of an industrial process, in accordance with plant operating goals, without requiring a complicated trial and error process. The system and methods enable configuring optimization preference and optimization priority for key manipulated variables (MVs) of the industrial process. The system and methods translate the configured optimization preference and optimization priority for each key MV into prioritized economic objective functions. The system and methods calculate a set of normalized cost factors for use in a given prioritized economic functions based on a model gain matrix of manipulated variables and controlled variables of the industrial process. The system and methods automatically determine best achievable targets for the MVs by solving each prioritized economic objective functions in sequence of priority within the constraints of: (1) the determined CV best achievable steady-state targets, and (2) the (Continued)

determined MV best achievable steady-state targets from higher prioritized economic objective functions.

19 Claims, 12 Drawing Sheets

(56) References Cited

U.S. PATENT DOCUMENTS

| | | | |
|---|---|---|---|
| 6,714,899 B2 | 3/2004 | Kassmann | |
| 7,194,318 B2* | 3/2007 | Attarwala | G05B 13/048 700/28 |
| 9,477,214 B2* | 10/2016 | Tiwari | G05B 13/02 |
| 2001/0021900 A1 | 9/2001 | Kassmann | |
| 2004/0049299 A1* | 3/2004 | Wojsznis | G05B 11/32 700/29 |
| 2004/0117766 A1* | 6/2004 | Mehta | G05B 11/32 717/121 |
| 2007/0168057 A1* | 7/2007 | Blevins | G05B 13/022 700/53 |
| 2008/0281652 A1* | 11/2008 | Iqbal | G06Q 10/06 705/7.36 |
| 2010/0274368 A1* | 10/2010 | Terndrup | G05B 13/021 700/33 |
| 2013/0204403 A1* | 8/2013 | Zheng | G05B 13/048 700/38 |
| 2013/0204420 A1* | 8/2013 | Treiber | G05B 11/32 700/103 |
| 2014/0089055 A1* | 3/2014 | Smith | G06Q 10/0631 705/7.36 |
| 2014/0257526 A1* | 9/2014 | Tiwari | G05B 13/02 700/29 |
| 2017/0205809 A1* | 7/2017 | Sayyarrodsari | G05B 19/4155 |

OTHER PUBLICATIONS

International Search Report for PCT/US2016/029379 dated Jun. 29, 2016 entitled "Formulating Steady-State Targets Using Prioritized Objective Functions".

Qin, S. Joe, et al., "A survey of industrial model predictive control technology", Science Direct, Control Engineering Practice, vol. 11, 733-764 (2003).

* cited by examiner

300

---

PLANT OPERATION GOALS:

320 — 1. MAXIMIZE HEATER FEED PASS FLOW TO ITS HIGH OPERATING LIMIT;

330 — 2. MAXIMIZE HEATER COIL OUTLET TEMPERATURE TO ITS HIGH OPERATING LIMIT;

340 — 3. MINIMIZE COLUMN OVERHEAD TEMPERATURE TO ITS LOW OPERATING LIMIT;

350 — 4. MAXIMIZE COLUMN JET FLOW BEFORE MOVING COLUMN OVERHEAD PRESSURE;

360 — 5. MINIMIZE MOVEMENT OF COLUMN OVERHEAD PRESSURE.

SELECT MV PREFERENCES

Smart Tune Configuration - crudeunit

This page allows you to specify the preferred economic direction for each MV. MVs must be set to one of the following choices: Maximize, Minimize, Minimum Movement or No Preference. For MVs set to No Preference the optimal direction will be determined by the desired CV constraints selected in a later step.

Smart Tune Workflow

1. Define Structure
2. Select CV Ranks
3. Select MV Preferences
4. Prioritize MVs
5. Select CV Constraints
6. Evaluate Strategy
7. Initialize Tuning

No Preference MVs

| MV Name | Subcontroller | Description |
|---|---|---|
| | HEATER | |
| | COLUMN | |
| TOP_CIRC_FL | | Top Circulation Flow |
| TOP_CIRC_TP | | Top Circulation Temperature |
| BTM_CIRC_FL | | Bottoms Circulation Flow |
| BTM_CIRC_TP | | Bottoms Circulation Temperature |

✦ Maximize
═ Minimize
⇶ Minimum Movement
◇ No Preference

✦ Maximize MVs

| MV Name | Subcontroller | Description | Units |
|---|---|---|---|
| FEED_1 | HEATER | Feed Pass 1 Flow | BPD |
| FEED_2 | HEATER | Feed Pass 2 Flow | BPD |
| FURN_COT | HEATER | Furnace COT | DEG F |
| JET_FLOW | COLUMN | Side Cut 01 (Jet Flow) | BPD |
| LD_FLOW | COLUMN | Side Cut 02 (Light Diesel) | BPD |
| HD_FLOW | COLUMN | Side Cut 04 (Heavy Diesel) | BPD |

═ Minimize MVs

| MV Name | Subcontroller | Description | Units |
|---|---|---|---|
| OVH_TEMP | COLUMN | Ovhd Temperature | DEG F |

⇶ Minimum Movement MVs

| MV Name | Subcontroller | Description | Units |
|---|---|---|---|
| OVH_PRESS | COLUMN | Ovhd Pressure | PSIG |

[Previous] [Next] [Finish] [Cancel]

FIG. 3B

SELECT CV CONSTRAINTS

Smart Tune Configuration - crudeunit — 308

This page will calculate the preferred economic direction for MVs previously designated with "No Preference".
This is done by specifying the preferred constraint set for one of more CVs related to the free MVs.

Smart Tune Workflow

1. Define Structure
2. Select CV Ranks
3. Select MV Preferences
4. Prioritize MVs
5. Select CV Constraints
6. Evaluate Strategy
7. Initialize Tuning

No Preference MVs

| | | |
|---|---|---|
| 1 | HEATER | |
| 2 | COLUMN | |
| + | TOP_CIRC_FL | Top Circulation Flow |
| = | TOP_CIRC_TP | Top Circulation Temperature |
| + | BTM_CIRC_FL | Bottoms Circulation Flow |
| = | BTM_CIRC_TP | Bottoms Circulation Temperature |

Preferred Constraint Settings

| Controlled Variable | Description | Units | Low | High | None |
|---|---|---|---|---|---|
| REFLUX_ATM | Reflux ATM Tower | BPD | ● | ○ | ○ |
| TOP_CIRC_R | Top Circ/Btms | BPD/BPD | ○ | ○ | ● |
| DRUM_PRESS | Drum Pressure | PSI | ○ | ○ | ● |

[Previous] [Next] [Finish] [Cancel]

FIG. 3E

FORMULATING STEADY-STATE TARGETS USING PRIORITIZED OBJECTIVE FUNCTIONS

RELATED APPLICATION

This application claims the benefit of U.S. Provisional Application No. 62/155,346, filed on Apr. 30, 2015. The entire teachings of the above application are incorporated herein by reference in its entirety.

BACKGROUND OF THE INVENTION

Model Predictive Control (MPC) is the most widely used advanced process control technology applied in process industries. There are more than 10,000 worldwide applications currently in service. A MPC controller relies on a process model to predict the process behavior (the controlled variables, CV) and makes changes to the manipulated variables (MV) so that the MPC controller can keep the process running inside a prescribed constraint set. When inside the constraint set, a MPC controller also makes changes relative to the MVs, so that the process behavior is optimized (as steady-state targets) based on a given economic objective function. The MPC controller can be tuned to configure preferred optimizing of the process behavior when formulating steady-state targets by the given economic objective function.

Tuning of the MPC controller to achieve a preferred optimized behavior for an industrial process based on plant operation goals is not a trivial task. Rather, the tuning requires adjusting the cost factors for each MV in the context of the single, given economic objective function, by means of a challenging and time consuming trial and error technique, until the correct balance of cost factors are found to achieve the preferred optimization. Due to the dependencies and interactions among the process variables, the tuning of one MV may have affects that must be balanced across multiple MVs using this trial and error technique. Further, when using the single objective function with a large number of MVs, performing the trade-offs for optimization makes the process behavior sensitive to process model and operating condition changes, resulting in the cost factors needing to be re-tuned often to maintain the preferred optimized behavior. As such, there is a need in the process industry for a method to configure preferred optimization behavior for an industrial process, based on plant operation goals, that does not require challenging and time consuming trial and error tuning of the MPC controller.

SUMMARY OF THE INVENTION

The present invention addresses the issue of configuring preferred optimization behavior for an industrial process (as steady-state targets) at a MPC controller, without requiring trial and error tuning of the MPC controller. Specifically, embodiments of the present invention are directed to a computer system and a computer-implemented method for optimally controlling the behavior of an industrial process, in accordance with plant operation goals. The computer system and method begins with the user configuring optimization preferences and optimization priorities for each of multiple key manipulated variables (MVs) of the industrial process at a plant. In embodiments of the present invention, the user may configure the optimization preferences and optimization priorities at the target optimizer module of an MPC controller via a user interface display communicatively coupled to the target optimizer module. In some embodiments, the optimization preferences and optimization priorities may be based on plant operation goals for the industrial process. In these embodiments, the plant operation goals may be specified as a prioritized sequence of preferred optimization directions and priorities on the key MVs.

The user may configure the optimization preferences at the target optimizer module (via the user interface display) to indicate maximization, minimization, minimal movement, or no preference for each key MV, in accordance with the optimization preference defined in the plant operation goals for the respective key MV. In some embodiments, if a key MV is not included in the plant operation goals, then the key MV is configured as having no optimization preference at the target optimizer module. In some of these embodiments, when an MV is configured as having no optimization preference, the user may further configure a set of preferred controlled variable constraints in relation to the key MV. In some embodiments, the user may also configure an optimization priority at the target optimizer module (via the user interface display) in accordance with the optimization priority defined in the plant operation goals for the respective key MV. The optimization priority may be assigned based on a prioritized sequence of optimization defined in the plant operation goals. In some embodiments, key MVs not explicitly included in the plant operation goals may be assigned lower priorities than the key MVs which are explicitly included in the plant operation goals.

For each of the multiple key MVs, the system and method may translate the configured optimization preferences and optimization priorities into a prioritized objective function, such that the optimization of the multiple key MVs are defined by multiple prioritized economic objective functions. In embodiments of the present invention, the multiple, prioritized economic objective functions are used in place of the single economic objective function traditionally used in formulating steady-state targets. In some embodiments, the direct translation may reduce the need of trial and error tuning for configuring plant operation goals, and in other embodiments the direct translation may eliminate the need of trial and error tuning for configuring plant operation goals. The direct translation of optimization preferences and optimization priorities into economic objective functions may reduce the steady-state targets' sensitivity to control model and operating condition changes.

For each of the multiple prioritized economic objective functions, the system and method may further calculate a set of normalized cost factors for use in the multiple prioritized economic objective functions. The system and method may calculate the set of normalized cost factors based on a model gain matrix of the manipulated variables and controlled variables of the industrial process. In embodiments in which some MVs are configured as having no optimization preference, the configured set of CV constraints may be used for determining a cost factor for the respective key MV. In some embodiments, a normalized cost factor is calculated to correspond to a key MV, and the respective prioritized economic objective function (which includes the key MV) uses the normalized cost factor to weigh the corresponding MV to determine economic optimization. Further, in some embodiments, the optimization preference of a key MV is represented in a respective economic objective function by the sign of the corresponding cost factor. In these embodiments, a negative sign of the corresponding cost factor indicates the optimization preference as maximize, and a positive sign of the corresponding cost factor indicates the optimization preference as minimize or minimum movement.

Once the prioritized economic objective functions and cost factors are calculated, the system and method determine the best achievable steady-state targets for the key MVs by solving each prioritized economic objective function in sequence of respective priorities. In some embodiment, the formulation of steady-state targets also includes solving for the best achievable CV steady-state targets by minimizing the CV constraints violation objective function. The solving of each function is subject to constraints of the determined best achievable CV steady-state targets and constraints of the determined best achievable MV steady-state targets formulated from the higher prioritized economic objective functions. The system and method, then, transmit control signals to adjust the industrial process at the plant based on the determined best achievable steady-state targets. In some embodiments, the adjusting of the industrial process at the plant comprises programming physical components of the plant.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A depicts example plant operation goals for the plant process in an embodiment of the present invention.

FIGS. 3B-3E illustrate user interface screens for configuring optimization preferences and priorities in embodiments of the present invention.

DETAILED DESCRIPTION OF THE INVENTION

A description of example embodiments of the invention follows. The teachings of all patents, published applications and references cited herein are incorporated by reference in their entirety.

Example Process Modeling System

Figure 1A:
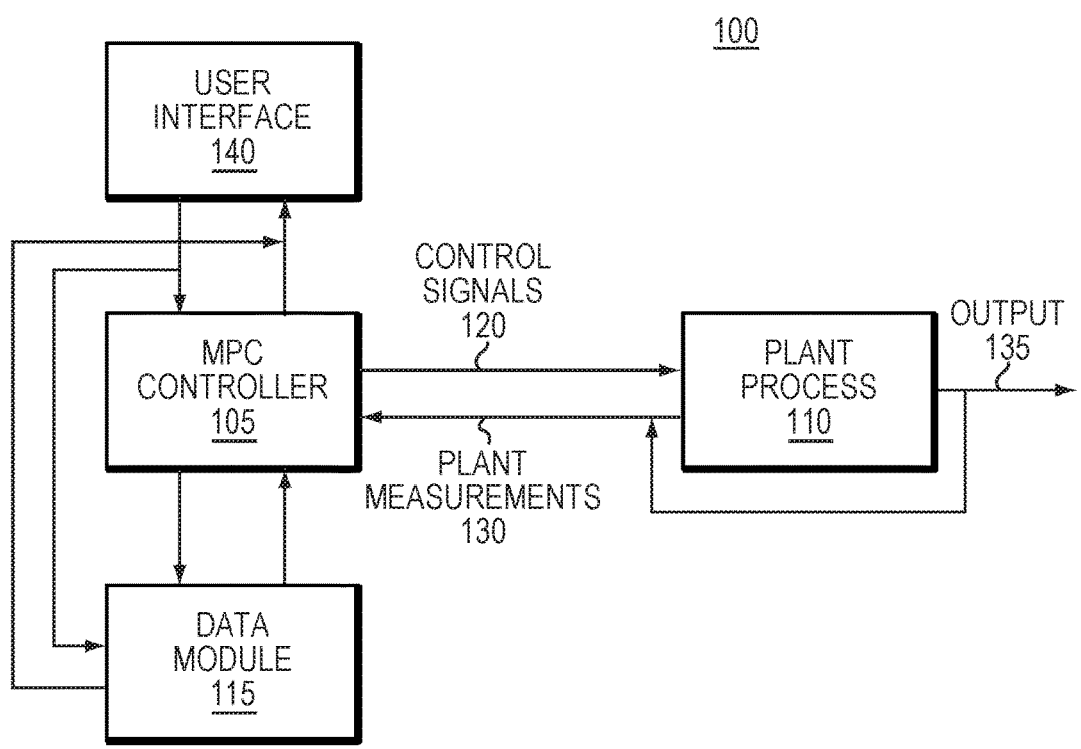
FIG. 1A is a schematic view of an example process modeling system for executing some embodiments of the present invention.

FIG. 1A is a schematic view of an example process modeling system 100 for executing some embodiments of the present invention. In some embodiments, the process modeling system 100 is DMC3® by Aspen Technologies, Inc., Bedford, Mass. In the embodiments of FIG. 1A, process modeling system 100 includes a user interface display 140, that is communicatively connected to a MPC Controller 105 and automated data selection and on-line model identification module (Data Module) 115. The interface connection between the user interface display 140 and each of the MPC Controller 105 and Data Module 115 may be a wired connection or wireless connection, such as WiFi or Bluetooth. In some embodiments, as shown in FIG. 1A, the MPC Controller 105 and the Data Module 115 may be configured as separate subsystems of one or more processors for controlling and modeling a plant process 110. In these embodiments, the MPC Controller 105 and the Data Module 115 may be communicatively coupled by a wired or wireless connection, such as WiFi or Bluetooth. In other embodiments, the Data Module 115 may be configured as part of the MPC Controller 105 subsystem, which is implemented as one or more processors for controlling and modeling a plant process 110. The MPC Controller 105 is further communicatively connected to the plant process 110 (of a physical plant, such as a petrochemical plant or the like).

The Data Module 115 generates at least one of linear and non-linear models (MPC models) for defining the behavior of the plant process 110. The MPC Controller 105, communicatively coupled to the Data Module 115, uses the generated MPC models to predict, optimize, and control the future behavior of the plant process 110. In example embodiments, the MPC models generated at Data Module 115 for optimization of the plant process 110 may include economic objective functions that determine steady-state targets defining the optimal behavior of the plant process 110 based on weighted cost factors. The Data Module 115 may provide parameters for a user or system to define the behavior of the plant process 110 as a generated MPC model, including parameters for MVs and CVs respective to the plant process 110. These parameters may be displayed at user interface display 140 for the user or system to define the MPC model for the plant process 110. In some embodiments, the Data Module 115 may, instead or in addition, define the behavior of the plant process 110 as generated MPC models based on plant measurements 130 (e.g., from plant process output 135) received at the MPC Controller 105 from the physical plant, historical process data (e.g., from a historian database), and such. In some embodiments, the generated MPC models (or provided parameters) may be stored in memory at, or communicatively coupled to, Data Module 115, and may be loaded to the Data Module 115 at a later time for defining the behavior of a plant process 110.

The MPC Controller 105 loads and solves the generated MPC models to predict the future behavior of the plant process 110, as defined by controlled variables (CVs), in response to changes in the process conditions, as determined from plants measurements 130, and other plant process output 135, received from the plant process 110 and from the values of the manipulated variables (MVs). The MPC Controller 105 also loads and solves the generated MPC models to optimally adjust the plant process 110, by adjusting the MVs, in response to the plant measurements 130 and modeled predictions. Specifically, generated MPC models may be used to optimally adjust the MVs to ensure that the plant process 110 continues to run with the most optimal economic benefit possible inside a prescribed constraint set.

The MPC controller 105 may need to be tuned, by configuring MV related parameters presented on the user interface display 140, in accordance with goals or requirements for the plant process 110. The tuning enables the respective model to determine the most optimal economic benefit possible for the plant process 110, inside the prescribed constraint set (for CVs and MVs), based on the operation goals or requirements for the plant. For example, MPC controller 105 may need to be tuned so that the respective model determines the most optimal economic benefit possible for the plant process 110, inside the prescribed constraint set, based on the plant operation goal of maximizing heater feed pass flow. Traditionally, this tuning would require the user to adjust the cost factors for the respective MV (e.g., heater feed pass flow) and any other MV related to the respective MV (e.g., coil outlet temperature) in a trial and error fashion to correctly account for the plant operation goals in the single economic objective function of the respective model. In embodiments of the present invention, this tuning would instead require the user to specify optimization preferences and priorities for the respective MV, and any other MV related to the respective MV, to generate multiple prioritized economic objective functions for the respective model to correctly account for the plant operation goals.

The tuned MPC Controller 105 loads and solves the generated model, with the multiple economic objective functions defining the preferences and priorities for MVs, to optimally adjust the MVs to control the behavior of the plant process 110 (CVs) in accordance with the plant operation goals. The MPC Controller 105 transmits control signals 120 to the plant process 110 (at the physical plant) to push the plant process 110 (e.g., program components at the physical plant based on the adjusted MVs) towards the configured optimized behavior. The physical plant is generally configured with one or more multivariable dynamic systems (or other plant process control systems) that update the plant process 110 based on the control signals 120. The multivariable dynamic systems of the plant process transmits plant measurements 130, and other process output 135, of the updated plant process 110 back to the MPC Controller 105 for further predictions and optimization of the updated plant process 110.

Figure 1B:
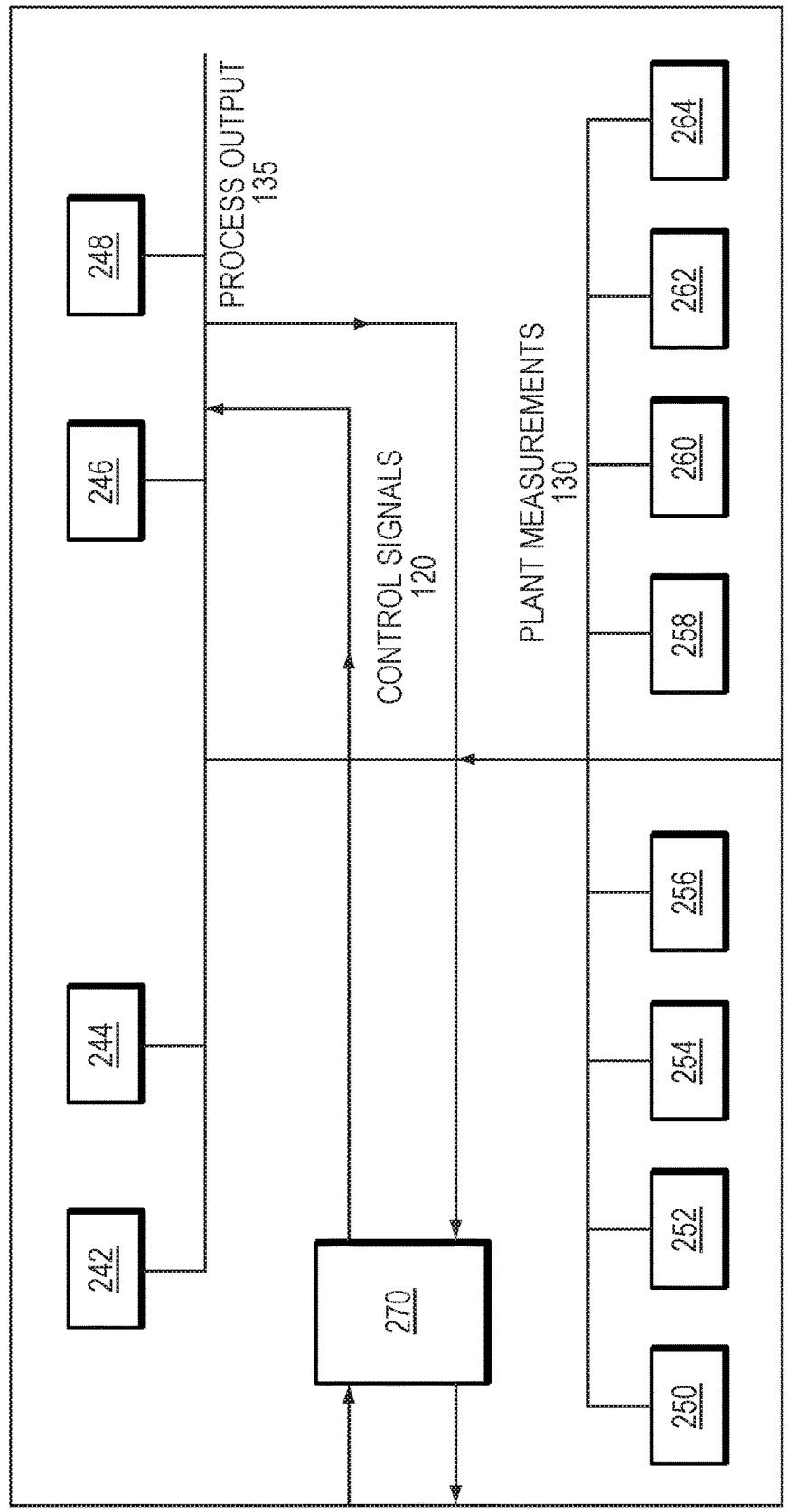
FIG. 1B is a schematic view of example plant equipment for measuring and controlling a plant process in embodiments of the present invention.

FIG. 1B is schematic view of example plant equipment for measuring and controlling the plant process 110 in embodiments of the present invention. A plant process 110 is generally performed in a physical plant configured with one or more plant process control systems 270 (e.g., multivariable dynamic systems) to measure and control the plant process 110. In FIG. 1B, the plant process control system 270 is configured (and equipped) to take plant measurements 130 of the parameters associated with the plant process 110, such as temperature, pressure, and flow. Specifically, the plant process control system 270 communicates with physical sensors configured at the plant to determine the current plant measurements associated with the plant process 110. For example the plant process control system 270 may communicate with flow meter 250 to determine column jet flow associated with the plant process 110, pressure sensor 252 to determine column overhead pressure associated with the plant process 110, temperature sensor 254 to determine column overhead temperature associated with the plant process 110, and temperature sensor 256 to determine feed stream temperature associated with the plant process 110. For further example, the plant process control system 270 may also communicate with flow meter 258 to determine heater feed pass flow associated with the plant process 110, pressure sensor 260 to determine fuel gas pressure associated with the plant process 110, pressure sensor 262 to determine steam pressure associated with the plant process 110, and pressure sensor 264 to determine reflux drum pressure associated with the plant process 110.

The plant process control system 270 may be further configured to transmit the plant measurements 130 determined by the physical sensors 250, 252, 254, 256, 258, 260, 262, and 264 to the MPC Controller 105. The MPC Controller 105 may use the transmitted plant measurements 130 in the generated MPC models to determine the current behavior associate with the respective MVs (e.g., column jet flow, column overhead pressure, column overhead temperature, feed stream temperature, and heater feed pass flow) and respective CVs (e.g., fuel gas pressure, steam pressure, and reflux drum pressure) of the plant process 110. Based on the plant measurements 130, the MPC Controller 105 may make updated predictions for the future behavior of the plant process 110 and further adjust the MVs to optimize the behavior of the plant process 110 to meet plant operation goals (defined MV preferences and priorities) as reflected in multiple economic objective functions defining the optimized behavior for the plant process 110.

The MPC Controller 105 further transmits control signals 120 to the plant process 110 (at the physical plant) configured to push the plant process 110 (e.g., program components at the physical plant based on the further adjusted MVs) towards the optimized behavior. The plant process control system 270 receives the control signals 120 and is configured (and equipped) to adjust (program) physical components of the plant, such as an actuator 242, valve 244, pump 246, and gauges 248, in accordance with the further adjusted MVs. The plant process control system 270 may capture the updated settings of the adjusted physical components (actuator 242, valve 244, pump 246, and gauges 248), as part of the process output 135, along with updated plant measurements 130 from the physical sensors 250, 252, 254, 256, 258, 260, 262, and 264. The plant process control system 270 may, then, transmit the updated plant measurements 130 and process output 135 to the MPC controller 105 to be used by the MPC models for further prediction and optimization of the plant process 110.

Example MPC Controller

Figure 2:
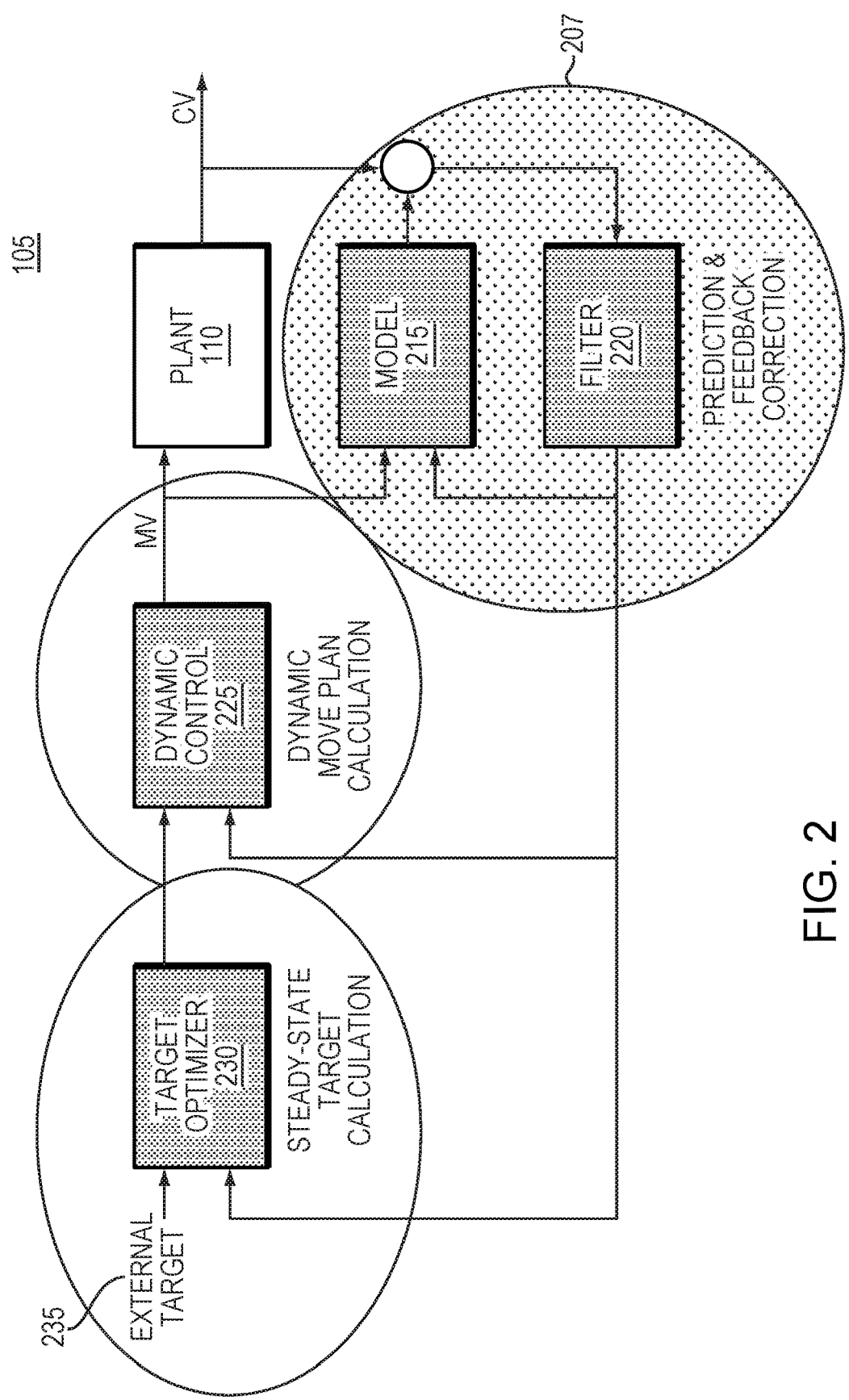
FIG. 2 is a block diagram of an example MPC controller configuration in embodiments of the present invention.

FIG. 2 is a block diagram of an example MPC controller 105 system configuration in embodiments of the present invention. In some embodiments, the MPC controller 105 is configured as a subsystem of the process modeling system 100 of FIG. 1A. In the embodiment of FIG. 2, the Data Module 115 is integrated into the modules of the MPC Controller 105 subsystem, which are configured as one or more processors for controlling and modeling a plant process 110. There are three forces driving the movement of the MVs in a typical MPC controller 105: (1) the feedback correction; (2) the steady-state target optimization; and (3) the dynamic move plan optimization. While the movement of the MVs from cycle to cycle is intended to improve regulatory and economic optimization performance, the movement can cause undesirable consequences (e.g., plant operations) due to issues in the model and/or tuning.

The MPC controller 105 comprises a prediction and feedback correction module 207, which includes model 215 for predicting the behavior of the plant process 110. Note, model 215 may be generated by the Data Module 115, as in FIG. 1A, rather than generated by the prediction and feedback correction module 207, as in FIG. 2. The prediction and feedback correction module 207 also includes filter 220, which provides feedback correction by removing the prediction bias from the calculation (solutions) determined by model 215. In some embodiments, the filter 220 may use the difference between plant measurements 130 and model predictions as a bias to shift the future predictions, and in other embodiments the filter 220 may comprise a Kalman Filter. See, e.g., S. Joe Qin & Thomas A. Badgwell, "*A survey of industrial model predictive control technology*," Control Engineering Practice, 11:733-764 (2003), which is incorporated herein by reference in its entirety. The prediction and feedback correction module 207 may predict the plant process 110 based on historical values (open-loop prediction) retrieved from computer memory (e.g., historian database). The prediction and feedback correction module 207 may also predict the plant process 110 based on the adjusted values (closed-loop prediction) of MVs and of the filtered (corrected feedback) values of CVs from plant measurements 130 and output 135 of the plant (i.e., data from physical plant sensors of FIG. 1B).

In the MPC controller 105 of FIG. 2, the modeled (and filtered) solutions from the prediction and feedback correction module 207 are provided to the target optimizer module 230 for determining optimal values for the MVs. The target optimizer module 230, as part of the external target 235, uses an optimization model for formulating steady-state targets (including optimal MV values) for a given run cycle of the plant process 110. Note, the target optimizer module 230 may use an optimization model generated by the Data Module 115, as in FIG. 1A, rather than generated by the target optimizer module 230, as in FIG. 2. The target optimizer module 230 may formulate the steady-state targets (optimal MV values) using multiple economic objective functions generated based on preferences and priorities of respective key MVs (defined based on plant operation goals).

In the MPC controller 105 of FIG. 2, the steady-state targets calculated by target optimizer module 230 are provided to the dynamic control module 225. The dynamic control module 225 uses the steady-state targets to calculate a move plan for the plant process 110. As such, the MPC controller 105 of the present invention performs two separate optimization functions for optimizing a plant process 110. The first optimization function is a steady-state target formulation (performed at the target optimizer 230) which optimizes an economic objective function while preserving variable constraints. The second optimization function is the dynamic move plan calculation (performed at the dynamic control module 225) which drives the variables toward the steady-state targets in an optimally determined time series. The move plan calculated by the dynamic control module 225 (e.g., adjusted MVs) is then transmitted (e.g., as control signals 120) to the plant for adjusting the plant process 110. The move plan is also provided back to model 215 of the predictions and feedback correction module 207 for further predicting the behavior of plant process 110 (so the cycle can begin again in iteration).

Formulating Steady-State Targets

The target optimizer module 230 formulates the steady-state targets at each process run cycle to satisfy two requirements. First, target optimizer module 230 determines the steady-state targets (e.g., MV values) that will minimize any CV constraint violation in the calculated steady-state using a constraint violation objective function. Second, the target optimizer module 230 adjusts the MV values to optimize the economic benefit of the plant process 110 within the prescribed constraints using one or more economic objective functions. Note, "economic optimization" refers to the target optimizer module 230 determining a solution (steady-state targets) formulated for plant operation optimization (e.g., profit maximization or cost minimization). The steady-state targets are recalculated by the target optimizer module 230 at each run cycle of the plant process 110 to accommodate the prediction/feedback corrections and any tuning changes. In embodiments of the present invention, the tuning changes (e.g., changes in specified preferences and priorities of key MVs to define plant operation goals), may necessitate regenerating multiple respective economic objective functions for calculating the steady-state targets for the plant process 110. An example method and apparatus for steady-state target calculation is described in U.S. Pat. No. 6,714,899 (by Assignee), which is incorporated herein by reference in its entirety.

The target optimizer module 230 of the MPC controller 105 typically formulates steady-state targets as follows. The target optimizer module 230 first, identifies the best achievable CV steady-state targets for the process, subject to MV/CV constraint limits. As shown in Equation 1 below, the best achievable CV steady-state targets are identified by minimizing a constraint violation objective function subject to prescribed variable constraint limits. In regards to Equation 1, MV is the manipulated variables represented as a vector, CV is the controlled variables represented as a vector, and CV=H(MV) is the variable relationship in the steady-state. $MV_L$ and $MV_H$ are the lower and higher constraint limits, respectively, for the MVs represented as vectors. $CV_L$ and $CV_H$ are the lower and higher constraint limits, respectively, for the CVs represented as vectors. $S_L$ and $S_H$ are the slack variables which, respectively, represent the lower and higher limits for CV constraint violations used in minimizing the constraint violation objective function.

$$\min_{MV} F(S_L, S_H)$$

Subject to:

$$CV = H(MV)$$

$$MV_L \leq MV \leq MV_H$$

$$CV_L - S_L \leq CV \leq CV_H + S_H$$

$$S_L \geq 0 \text{ and } S_H \geq 0 \qquad \text{(Equation 1)}$$

The target optimizer module 230, then, identifies the best achievable MV steady-state targets for minimum economic cost (i.e., economic optimization). As shown in Equation 2, the target optimizer module 230 traditionally identifies the MV steady-state targets using of a single economic objective function. Note, in embodiments of the present invention, the target optimizer module 230 instead identifies the MV steady-state targets using multiple prioritized (or ordered) economic objective functions generated based on the priorities and preferences configured for respective key MVs. The function (or functions in embodiments of the present invention) uses cost factors ($cost_i$) for weighting each respect MV input ($mv_i$) to formulate MV steady-state targets with minimum economic cost, subject to the identified best achievable CV steady-state targets and MV/CV constraint limits as described for Equation 1.

$$\min_{MV} \Sigma cost_i * mv_i$$

Subject to:

$$CV = H(MV)$$

$$MV_L \leq MV \leq MV_H$$

$$CV_L - S_L \leq CV \leq CV_H + S_H \qquad \text{(Equation 2)}$$

Formulating Dynamic Move Plan

The dynamic control module 225 of MPC controller 105 further optimizes the behavior of the plant process 110 (by dynamic move plan calculations) by determining a time series for adjusting the plant process 110 (e.g., MVs) according to the calculated steady-state targets (i.e., a dynamic move plan). Typically, the dynamic control module 225 attempts to calculate an optimal dynamic move plan that minimizes a weighted array of errors between the predicted closed-loop dynamic responses and the requested steady-state targets. The dynamic control module 225 may also use a mechanism, such as move suppression, to adjust the speed of the movement of the MVs (over the time series) for a more stable closed-loop performance in anticipating the existence of model uncertainties. See, e.g., S. Joe. Qin and Thomas A. Badgwell, "*A survey of industrial model predictive control technology*," Control Engineering Practice, vol. 11, 733-764 (2003), which is incorporated herein by reference in its entirety. The MV adjustments determined by the dynamic move plan for each time period may be transmitted (e.g., as control signals 120) to the plant process control system 270 at the respective time period to drive the closed-loop responses to reach the requested steady-state targets in an optimal way (e.g., by the plant process control system 270 adjusting physical sensors and/or components as shown in FIG. 1B).

Plant Operation Goals

The steady-state targets may be formulated, and a move plan calculated, in order to optimize economic benefits of the plant process 110 according to defined plant operation goals 300. FIG. 3A depicts plant operation goals for the plant process 110 in an example embodiment of the present invention. In other embodiments, the plant operation goals 300 may be expressed in other formats that provide directions regarding the operation goals for the plant process 110. In yet other embodiments, the directions may not be operation goals, but may be other goals regarding the optimization of the plant process 110, such as marketing goals. The plant operation goals 300 may be configured at a user interface, such as a graphical user interface, a command-line interface, and the like, presented on user interface display 140. The plant operation goals 300 may also be automatically provided by a process control subsystem of the processing modeling system 100, by a plant process control system 270, or by any other modeling or plant system.

The plant operation goals 300 may be expressed in regards to key MVs of the plant process 110, such as heater feed pass flow in goal 320, heater coil outlet temperature in goal 330, column overhead temperature in goal 340, column jet flow in goal 350, and column overhead pressure in goal 360. The plant operation goals 300 may indicate an optimization preference for each of the key MVs, such as maximization for the heater feed pass flow MV in goal 320, maximization of heater coil outlet temperature MV in goal 330, minimization for the column overhead temperature MV in goal 340, maximization of column jet flow MV in goal 350, and minimize move of the column overhead pressure MV in goal 360. The optimization preference may be an indication of the direction of optimization for key MVs in the steady-state targets for the plant process 110. The plant operation goals 300 may not include optimization preferences for all key MVs of the plant process 110. In some embodiments, if a key MV is assigned no optimization preference, a constraint set for CVs related to the key MV may be configured to drive the steady-state targets for the plant process 110 toward specific CV constraints.

The plant operation goals 300 may further indicate optimization priority for each of the key MVs of the plant process 110. As shown in FIG. 3A, a particular plant operation goal for a key MV may also be prioritized in regards to other related MVs, such as setting priority one for the heater feed pass flow MV in goal 320, priority two for the heater coil outlet temperature MV in goal 330, priority three for the column overhead temperature MV in goal 340, priority four for the column jet flow MV in goal 350, and priority five for the column overhead pressure MV in goal 360. The optimization priority may be an indication of the sequence in which the preferred optimization of key MVs should be included in steady-state formulations for the plant process 110. The plant operation goals 300 may not include optimization priorities for all key MVs of the plant process 110. In some embodiments, a particular key MV not being included in the plant operation goals 300 may indicate that there is no optimization priority for this MV. In some of these embodiments, the key MV not being included in the plant operation goals 300 may indicate that the key MV should be prioritized in sequence below the key MVs included in the plant operation goals 300.

Note, in response to receiving plant operation goals 300, a user would traditionally need to tune the target optimizer module 230 (e.g., by adjusting respective cost factors at a screen presented on user interface display 140), in a trial and error fashion, until steady-state targets are formulated in accordance with the plant operation goals 300. For example, based on the plant operation goals 300, the user would need to tune the target optimizer module 230 (by trial and error) until steady-state targets are formulated which, in order of priority, maximize heater feed pass flow MV in goal 320, maximize heart coil outlet temperature MV in goal 330, minimize column overhead temperature MV in goal 340, maximize jet flow MV before moving overhead pressure MV in goal 350, and minimize movement of column overhead pressure MV in goal 360. This traditional tuning is not a trivial task, but requires the user to adjust the cost factors for a respective key MV (e.g., column overhead temperature MV in goal 340), and each related MV (e.g., column jet flow MV in goal 350 and column overhead pressure MV in goal 360), by way of a challenging and time consuming trial and error process, until achieving the right combination of cost factors to meet the plant operation goals 300. Further, as shown in FIG. 3A, the plant operation goals 300 typically define optimization preferences/priorities in terms of multiple key MVs (e.g., heater feed pass flow MV in goal 320 and column overhead temperature MV in goal 340), which may introduce a formidable amount of tuning combinations that must be included in the trial and error process. In addition, due to the dependencies and interactions among the process variables, the tuning of one MV may have affects that must be balanced across multiple MVs using this trial and error process.

The traditional tuning of the target optimizer module 230 is further complicated by the formulation of steady-state targets using a single economic objective function, as shown in Equation 2. As such, to achieve preferred/prioritized optimization, the tuning of the cost factors (as the MV weighting) for each key MV must be balanced in the context of the single objective function. Further, in process configurations in which a large number of MVs are performing trade-offs for optimization, the use of the single objective function causes the steady-state targets sensitivity to control model and operating condition changes, resulting in the cost factors for key MVs needing to be retuned often to maintain preferred/prioritized controller behavior. Even further complicating the tuning of optimization preferences/priorities, the target optimizer module 230 traditionally formulates steady-state targets using incomplete economic data. Even though each MV should have an associated economic value, and the target optimizer module 230 should use each economic value to determine the cost factor for the respective MV, the economic values for many of the MVs are misrepresented and difficult to approximate. The absence of economic values may further cause the respective key MVs to be misrepresented in the control scope. This misrepresentation, combined with the existence of model uncertainties, may skew the formation of the steady-state targets, such that the targets cannot meet the plant operation goals 300, regardless of the tuning efforts.

Configuring Plant Operation Goals at Target Optimizer

Figure 3C:

In embodiments of the present invention, the plant operation goals 300, or other such plant goals, may be configured at the target optimizer module 230 without requiring trial and error tuning of cost factors. FIGS. 3B-3E illustrate user interface (interactive) screens for configuring optimization preferences and priorities in embodiments of the present invention. The user interface screens of FIGS. 3B-3E may be presented to the user on the user interface display 140 of FIG. 1A as part of the process modeling system 100. FIG. 3B illustrates an example user interface screen 302 for selecting MV preferences for optimizing the behavior of a plant process 110 based on plant operation goals 300. In accordance with goals 320, 330, and 350, the user interface screen 302 enables the user to configure the heater feed pass flow, heater coil outlet temperature (COT), and column jet flow MVs for maximization (i.e., by moving the heater feed pass flow, heater COT, and column jet flow MVs to the Maximize MVs section of the user interface screen 302). Similarly, in accordance with goal 340, the user interface screen 302 enables the user to configure the column overhead temperature MV for minimization (i.e., move the column overhead temperature MV to the Minimize MVs section of the user interface screen 302). In addition, according goal 360, the user interface screen 302 enables the user to configure the column overhead pressure MV for minimum movement (i.e., move the column overhead pressure MV to the Minimum Movement MVs section of the user interface screen 302).

In the embodiment of FIG. 3B, the process modeling system 100 does not require the user to assign preferences to all key MVs. For a key MV without an assigned preference, the process modeling system 100 (via the user interface screen 308) enables the user to configure a constraint sets of CVs related to the key MV (as shown in FIG. 3E). The configured CV constraint set may be used to drive the target optimizer 230 toward specific CV constraints when formulating steady-states for the plant process 110. For example, in FIG. 3B, the top circulation flow MV is configured with no optimization preference (i.e., under the No Preference MVs section of the user interface screen 302), and therefore, for this key MV, the user may configure a CV constraint set to drive the target optimizer 230 to specific CV constraints when formulating steady-states for the plant process 110.

Figure 3D:

FIGS. 3C-3D illustrates example user interfaces screens 304, 306 for prioritizing MVs for optimizing the behavior of a plant process 110 based on plant operation goals 300. FIG. 3C illustrates the user interface screen 304 for prioritizing the MVs related to the heater sub-controller of the plant, and FIG. 3D illustrates the user interface screen 306 for prioritizing the MVs related to the column sub-controller of the plant (both associated with the plant process 110). Plant operation goals 300 require that the MVs of the heater sub-controller (feed pass flow MV in goal 320 and COT MV in goal 330) be optimized prior to the MVs of the column sub-controller (overhead temperature in goal 340, jet flow in goal 350, and overhead pressure in goal 360). As such, the heater sub-controller and column sub-controller are configured as priority 1 and 2, respectively, as shown under the Subcontroller Properties section of user interface screens 304, 306. Setting the sub-controller priorities accordingly ensures that the target optimizer 230 optimizes the MVs of the heater sub-controller before the MVs of the column sub-controller. Such user interactive relative prioritization or ordering of goals is heretofor unachieved by the prior art. In this way, embodiments of the present invention provide step saving, efficient, and time saving advantages over the art.

After configuring the sub-controller priorities, the MVs within the sub-controllers may be configured at the user interface screens 304, 306. For example, as shown in FIG. 3C, the user may select HEATER under Subcontroller Priority of user interface screen 304, and select heater feed pass flow MVs as priority one and select heater COT MV as priority two (under Set Priority for MVs section of user interface screen 304) in accordance with plant operation goals 320 and 330. For another example, as shown in FIG. 3D, the user may select COLUMN under Subcontroller Priority of user interface screen 306, and select column overhead temperature MV as priority one, column jet flow MV to priority 2, and column overhead pressure MV to three (under Set Priority for MVs section of user interface screen 306) in accordance with plant operation goals 330 of FIG. 3A. Based on this configuration, the target optimizer 230 will determine optimization that first maximizes the heater feed pass flow MV and second maximizes the heater COT MV when formulating steady-state targets for the plant process 110. That is, as the heater sub-controller is configured as priority 1, the target optimizer 230 optimizes the MVs of the heater sub-controller (feed pass flow and heater coil outlet temperature) prior to the MVs of the column sub-controller. The target optimizer 230 will further determine optimization (as possible) that third minimizes column overhead temperature MV (as the column overhead temperature is set to be first minimized of the column sub-controller MVs) when formulating steady-state targets for the plant process 110. The target optimizer 230 will also determine optimization that (as possible) fourth maximizes the column jet flow MV and fifth minimally moves the column overhead pressure MV when formulating steady-state targets for the plant process 110.

FIG. 3E illustrates user interface screen 308 for selecting CV constraints for optimizing the behavior of a plant process 110 based on plant operation goals 300. In FIG. 3E, as the top circulation flow MV is set to no preference (under the No Preference MVs section of user interface screen 308), the user interface screen 308 enables the user to configure a constraint set for the CVs related to the top circulation flow MV in order to drive the MPC controller toward based on the configured CV constraints. Specifically, in FIG. 3E, the user configures a CV constraint set consisting of ATM tower reflux (set to a low constraint limit), top circuit reflux (set to no constraint limit), and reflux drum pressure (set to no constraint limit) for the top circulation flow MV. As there is a model relationship between the ATM tower reflux and the other listed MVs under No Preference MVs, setting the lower constraint limit for ATM tower reflux will set the direction for each of these listed MVs (as shown on user interface screen 308 by the icons to the left of each MV listed under the No Preference MVs section).

Method for Optimally Tuning Plant Processes

Figure 4A:
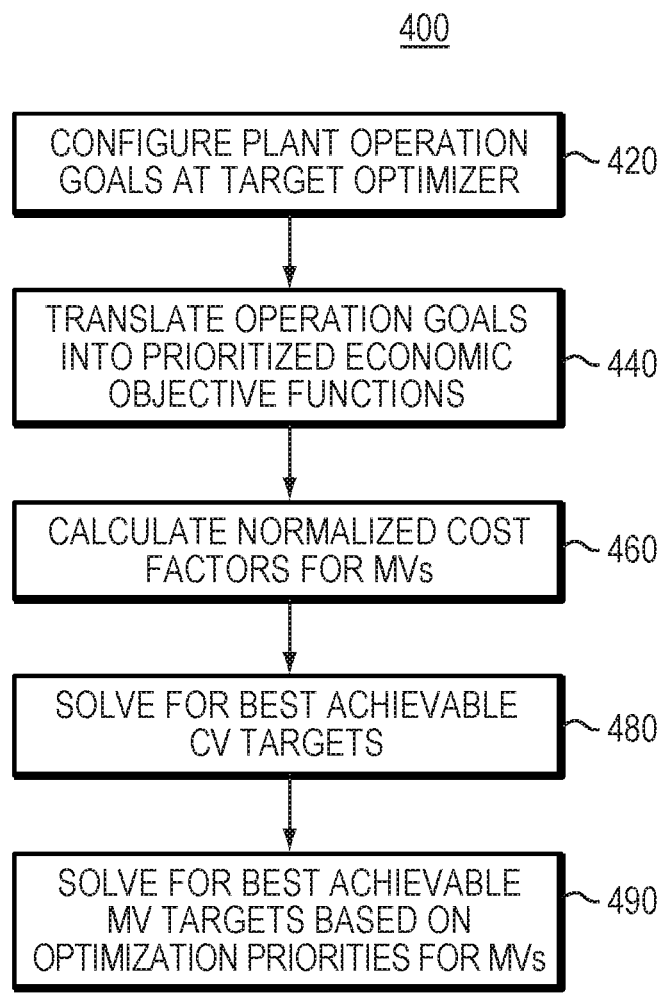
FIG. 4A is a flowchart depicting an example method for a target optimizer module (of FIG. 2) to control a plant process based on optimization preferences and optimization priorities in example embodiments of the present invention.

FIG. 4A is an example method 400 for optimizing behavior or a plant process, in a manner that accounts for plant operation goals (and prioritization thereof), without a complicated trial and error process. In some embodiments, the target optimizer module 230 executes the method 400 of FIG. 4A. The method 400 begins at step 420 by the user configuring plant operation goals 300 at the target optimizer module 230. In some embodiments, the method 400, step 420, may enable the user to configure the plant operation goals 300 at graphical user interface screens 302-308 presented on user interface display 140, which is communicatively coupled to the target optimizer module 230. In other embodiments, the user interface display 140 may be coupled to another module of the MPC controller 105, which, in turn, is communicatively coupled to the target optimizer module 230. In yet other embodiments, the interface user display 140 may present command-line interface, or any other interface formats, that enables providing data for use by the target optimizer 230. In still yet other embodiments, the plant operation goals 300 may instead be provided to the target optimizer 230 (or other module communicatively coupled to the target optimizer 230) as output from another process modeling control subsystem, plant control system (e.g., 270 of FIG. 1B), or any other modeling or plant system.

Figure 4B:
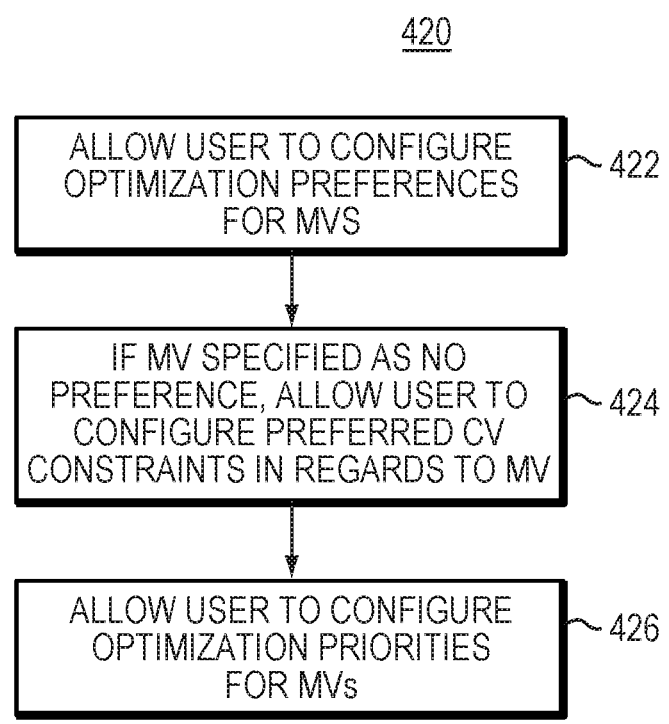
FIG. 4B is a flowchart depicting a method of configuring optimization preferences and optimization priorities at the target optimizer module in example embodiments of the example method in FIG. 4A.

FIG. 4B is a flowchart depicting further details for configuring the plant operation goals 300 in method 400, step 420. The method 420 begins, at step 422, by enabling the user to configure optimization preferences for key MVs, which may be configured in accordance with the optimization preferences defined in the plant operation goals 300 (e.g., as configured on the user interface screen 302 of FIG. 3B). In some embodiments, the optimization preference for each key MV may be indicated using one of four categories: Maximization, Minimization, Minimum Movement, or No Preferences. For example, to indicate the plant operating goal of maximizing heater feed pass flow in goal 320 of FIG. 3A, the user may specify the optimization preference of Maximization for the heater feed pass flow MV. In some embodiments, if the plant operation goals 300 do not include a particular key MV, such as top circulation temperature, then that key MV may be configured with the operation preference of No Preference. In other embodiments, the optimization preferences may include additional categories, may include different categories, or may include other indications of preference that do not constitute categories but similarly group MVs. If the user chooses the category, or other such indication, of No Preference for any key MV, method 420, at step 424, enables the user to further specify a set of preferred CV constraints (e.g., reflux drum pressure) to be used when formulating the steady-state targets for the respective No Preference MV (e.g. on the user interface screen 308 of FIG. 3E).

After specifying optimization preferences for key MVs, method 420, at step 426 enables the user to configure optimization priorities for the MVs (e.g., on the user interface screens 304, 306 of FIGS. 3C and 3D). The user may configure the optimization priorities to specify the order to optimize the MVs according to their configured optimization preferences. In some embodiments, the optimization priorities may be assigned in accordance with the prioritized sequence of optimization defined in the plant operation goals 300. For example, maximizing heater feed pass flow in goal 320 is numbered one in the prioritized sequence of optimization in the plant operation goals of FIG. 3A, so the optimization priority of one may be assigned to the heater feed pass flow MV at the target optimizer module 230, which has already been configured with the optimization preference of Maximization. In some embodiments, MVs not included in the plant operation goals 300 may be assigned a lower priority than the key MVs which are explicitly included in the plant operation goals 300. In some embodiments, each MV is assigned a unique optimization priority, and in other embodiments, the same optimization priority may be assigned to more than one MV. FIG. 4B depicts the user configuring the optimization priority following the optimization preferences, but in other embodiments, the user may select the optimization priorities prior to, or in conjunction with, the optimization preferences.

Solving Prioritized Economic Objective Functions

Once the optimization preferences and optimization priorities are configured at the target optimizer module 230 for key MVs, the method 400 (FIG. 4A), at step 440, directly translates the optimization priorities to multiple, prioritized economic objective functions, as shown in Equation 3. That is, instead of generating a single economic objective function, as shown in Equation 2, method 400, at step 440, generates multiple, prioritized economic objective functions, as shown in Equation 3. For example, maximizing the heater feed pass flow MVs in goal 320 is assigned priority one (and configured accordingly on the user interface screen 302 of FIG. 3B). Thus, method 400, at step 440, may generate an economic objective function, prioritized as one ($p_1$), that defines optimization for the heater feed pass flow MVs, as shown in Equation 3. Note, other MVs also prioritized as one ($p_1$), may also be included in the economic objective function of Equation 3. Similarly, method 400, at step 440, generates economic objective functions in accordance with the configured priorities of each key MV, such as an economic objective function, prioritized as two ($3_2$), that defines optimization for maximizing the COT MV, which is assigned to priority 2 in the plant operation goals 300. In regards to formulating steady-state targets, the economic objective function prioritized as one ($p_1$) has the highest optimization priority (to optimally maximize heater feed pass flow MVs), followed by the economic objective function prioritized as two ($p_2$) has the second highest optimization priority (to optimally maximize the COT MV), and so on according to priority ($p_1$). The direct translation of optimization preferences and priorities may eliminate the need, or at least reduce the need, of trial and error tuning for configuring plant operation goals at the target optimizer module. This direct translation may also reduce the steady-state targets' sensitivity to control model and operating condition changes.

$$\min_{MV} \Sigma_{i \in p_1} \text{ncost}_i * mv_i$$

Subject to:

$$CV = H(MV)$$

$$MV_L \leq MV \leq MV_H$$

$$CV_L - S_L \leq CV \leq CV_H + S_H \quad \text{(Equation 3)}$$

After generating the multiple objective functions based on the configured optimization preferences and optimization priorities, the method 400, at step 460, automatically calculates normalized cost factors (denoted as ncost in Equations 4 and 5) for the MVs included in each respective generated economic objective function. The cost factors may be calculated using the control model and the typical move or operating range information for the respective MVs. For any MVs configured as having no optimization preference, the preferred CV constraints specified in method 420, step 424, of FIG. 4B may instead be translated to the cost factor for the respective MV. As such, the method 400 calculates a cost factor for weighting each MV which ensures that the desired CV steady-state targets can be reached. The detailed steps on how to calculate the cost factor are as follows.

Assume that the plant process 110 can be described as a linear model, where the relationship between MV and CV can be represented by CV=G*MV (where G is a model gain matrix that represents the determined interaction of MVs and CVs at steady-state). An example embodiment of calculating the normalized cost factors by method 400, step 460, comprises, first, finding a manipulated variable, say $mv_m$, such that the manipulated variable has the largest number of non-zero elements in G. This example embodiment, further, sets cost factor to 1 for $mv_m$ (i.e., $ncost_m=1$). This example embodiment next estimates the so-called shadow price for CV, as shown in Equation 4.

$$cv_{cost_j} = \frac{ncost_m}{g_{mj}} \qquad \text{(Equation 4)}$$

$j = 1, \ldots,$ number of $cv$;

$g$ is the $(m, j)$ element from $G$

This example embodiment, then, estimates the cost factor for the remaining $mv_i$, as shown in Equation 5. Note, the actual sign of cost factor used in the objective function is determined by the MV optimization preference. Specifically, if the MV optimization preference is maximize, then the sign should be negative, otherwise, if the MV optimization preference is specified to minimize or minimum move, then the sign should be positive.

$$ncost_i = \Sigma_j |cv\_cost_j * g_{ij}| \qquad \text{(Equation 5)}$$

After the cost factors are calculated, the method 400, at step 480, starts the formulation of steady-state targets by solving for the best achievable CV steady-state targets by minimizing the CV constraints violation objective function. In some embodiments, this may be performed by the traditional formulation described with respect to Equation 1. Then, method 400, step 490, continues the formulation of steady-state targets by solving for the best achievable MV steady-state targets with the highest optimization priority sequentially. Specifically, method 400/step 490 automatically determines the best achievable MV steady-state targets for minimum cost by solving the generated economic objective function with the highest priority among the multiple generated prioritized economic objective functions, as shown in Equation 6. For example, in a configuration based on FIG. 3A, the feed pass flow MV is prioritized as one based on the plant operation goals 300 (and configured on user interface screen 304), and, accordingly, method 400/step 440 includes the feed pass flow MV in the generated economic objective function prioritized as one ($p_1$). Thus, method 400/step 490 first solves the economic objective function prioritized as one ($p_1$) to determine the best achievable MV targets, which includes determining the MV targets for maximizing the feed pass flow MV. As shown in Equation 6, the function uses normalized cost factors ($ncost_i$) for weighting each respective MV input variable ($mv_i$) assigned priority level $p_1$ to determine economic optimization, subject to the determined best achievable CV steady-state targets, as described above, and MV/CV constraint limits.

Then, method 400/step 490 continues the automatic formulation of steady-state targets by solving for the next best achievable MV steady-state targets with the next highest optimization priority sequentially. Specifically, method 400/step 490 automatically determines that the next best achievable MV steady-state targets for minimum cost by solving the generated economic objective function with the next highest priority among the multiple generated prioritized economic objective functions, as shown in Equation 6. For example, in a configuration based on FIG. 3A, the COT MV is prioritized as two based on the plant operation goals 300 (and configured on user interface screen 304), and, accordingly, method 400/step 440 included the feed pass flow MV in the generated economic objective function prioritized as two ($p_2$). Thus, method 400/step 490 next solves the economic objective function prioritized as two ($p_2$) to determine the next best achievable MV targets, which includes determining the MV targets for maximizing the COT MV.

The best achievable MV targets from the economic objective functions of higher priority become the constraints for the objective functions of the lower priorities during their formulation. For instance, in the example of FIG. 3A, the solved heater feed pass flow targets (solved in the highest priority economic objective function as described above) would become a constraint for formulating the COT targets (in the next highest economic objective function). As shown in Equation 6, the function uses cost factors ($ncost_i$) for weighting each respective MV input variable ($mv_i$) at priority level $p_2$ (including the COT MV) to determine economic optimization, subject to: (i) the best achievable CV steady-state targets solved above at priority level $p_1$, (ii) the best achievable MV steady-state targets for the higher prioritized functions solved above (e.g., the calculated heater feed pass flow targets), and (iii) MV/CV constraint limits. The method 400/step 490 similarly solves the other achievable MV steady-state targets (column overhead target MV in goal 340, column jet flow target MV in goal 350, and column overhead pressure MV in goal 360) in order from priority $p_3$ to the lowest priority $p_k$ using the corresponding prioritized economic objective function, as shown in Equation 6, where $obj_k$ is the subject economic objective function of priority $p_k$.

$$obj_k = \min_{MV} \sum_{i \in p_k} ncost_i * mv_i \qquad \text{(Equation 6)}$$

Subject to:
$CV = H(MV)$
$MV_L \leq MV \leq MV_H$
$CV_L - S_L \leq CV \leq CV_H + S_H$
$\sum_{i \in p_m} ncost_i * mv_i \leq obj_m, m = 1, \ldots, k-1$ Note that the method of prioritizing objective functions has been traditionally used for handling CV constraint violation in MPC, such as S. Joe Qin & Thomas A. Badgwell, "A survey of industrial model predictive control technology," Control Engineering Practice, 11:733-764 (2003), which is incorporated herein by reference in its entirety. Embodiments of the present invention, however, addresses with MV economic optimization problem, which normally is the next step in the MPC calculation after the processing of the aforementioned CV constraint violation calculation.

Digital Processing Environment

Figure 5:
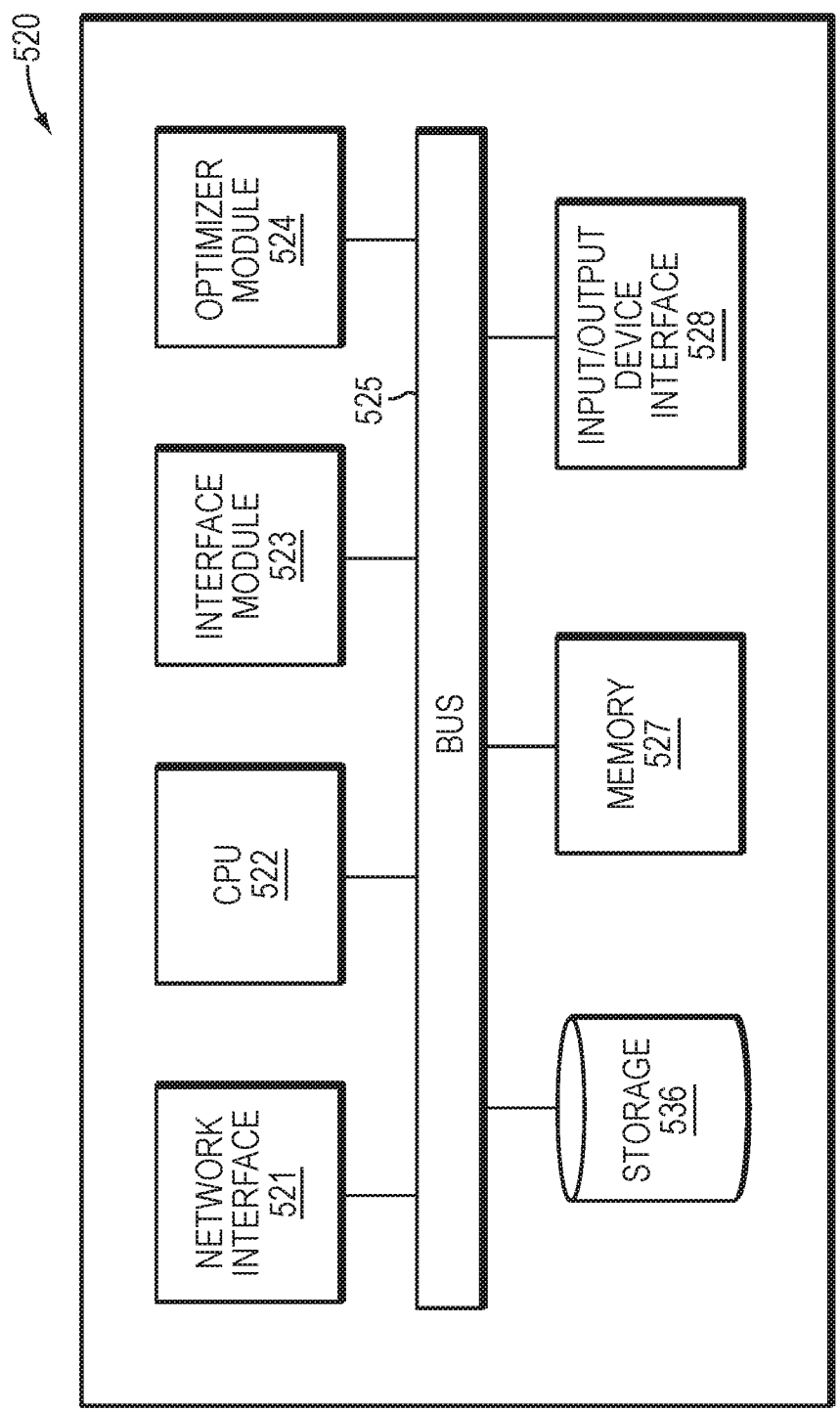
FIG. 5 is a block diagram of a computer (or digital processing) system for controlling a plant process according to at least one embodiment of the present invention.

FIG. 5 is a simplified block diagram of a computer-based system 520 that may be used for optimally controlling plant processes according to an embodiment of the present invention. The system 520 comprises a bus 525. The bus 525 serves as an interconnector between the various components of the system 520. Connected to the bus 525 is an input/output device interface 528 for connecting various input and output devices such as a keyboard, mouse, display, speakers, etc. to the system 520. A central processing unit (CPU) 522 is connected to the bus 525 and provides for the execution of computer instructions. Memory 527 provides volatile storage for data used for carrying out computer instructions. Storage 536 provides non-volatile storage for software instructions, such as an operating system (not shown). In particular, memory 527 and/or storage 536 are configured with program instructions implementing methods and/or modules 105, 115, 140, 207, 225, 230, 400, and 420 for configuring optimization preferences and priorities and controlling the behavior of a plant process based on the optimization preferences/priorities, as detailed in FIGS. 1A, 1B, 2, 4A, and 4B. The system 520 also comprises a network interface 521 for connecting to any variety of networks known in the art, including cloud, wide area networks (WANs) and local area networks (LANs).

Further connected to the bus 525 is an interface module 523 (e.g., user interface display 140 of FIG. 1A). The interface module 523 is configured to enable the user to specify the optimization preference and optimization priority for one or more MVs. The interface module 523 may provide input and output functions to the user through any means known in the art. For example, the interface module 523 may display MV parameters that are stored on the storage device 536 or memory 527 for enabling the user to make decision regarding prioritizing MVs. For further example, the interface module 523 may enable the user to specify input data (MV priorities and preferences) that is transmitted to any point communicatively coupled to the system 520 via the network interface 521 and/or input/output device interface 528.

The system 520 further comprises an optimizer module 524 (e.g., target optimizer module 230 of FIG. 2 and/or MPC Controller 105, Data Module 115 of FIGS. 1A and 2) that is communicatively/operatively coupled to the interface module 523. The optimizer module 524 is configured to formulate steady-state targets so that the system operates with optimal economic benefit possible within the prescribed constraint set for the variables. The optimizer module 524 may formulate steady-state targets through any means known in the art. For example, the optimizer module 524 may store optimization preferences and optimization priorities, such as in an array, on the storage device 536 or memory 527. For another example, the optimizer module 524 may translate optimization preferences and optimization priorities to economic objective functions by means of the CPU via the bus. For further example, the optimizer module 524 may retrieve optimization preferences and priorities from any point communicatively coupled to the system 520 via the network interface 521 and/or input/output device interface 528.

It should be understood that the example embodiments described herein may be implemented in many different way. In some instances, the various methods and machines described herein may be implemented by a physical, virtual, or hybrid general purpose computer, such as the computer system 520. The computer system 520 may be transformed into the machines that execute the methods described herein, for example, by loading software instructions into either memory 527 or non-volatile storage 536 for execution by the CPU 522. Further, while the interface module 523 and optimizer module 524 are shown as separate modules, in an example embodiment these modules may be implemented using a variety of configurations.

The system 520 and its various components may be configured to carry out any embodiments of the present invention described herein. For example, the system 520 may be configured to carry out the methods and/or modules 105, 115, 140, 207, 225, 230, 400, and 420 described hereinabove in relation to FIGS. 1A, 1B, 2, 4A and 4B. In an example embodiment, the interface module 523 and optimizer module 524 may be implemented in software that is stored on the memory 527 and/or storage device 536. In such an example embodiment, the CPU 522 and the memory 527 with computer code instructions stored on the memory 527 and/or storage device 536 implement an interface module that allows a user to specify optimization preferences and optimization priorities to a system that in response automatically formulates steady-state targets. Further, the components of the system 520 may further implement a dynamic control module that is operatively coupled to the optimizer module and configured to automatically calculate and implement a move plan based on the steady-state targets.

Figure 6:
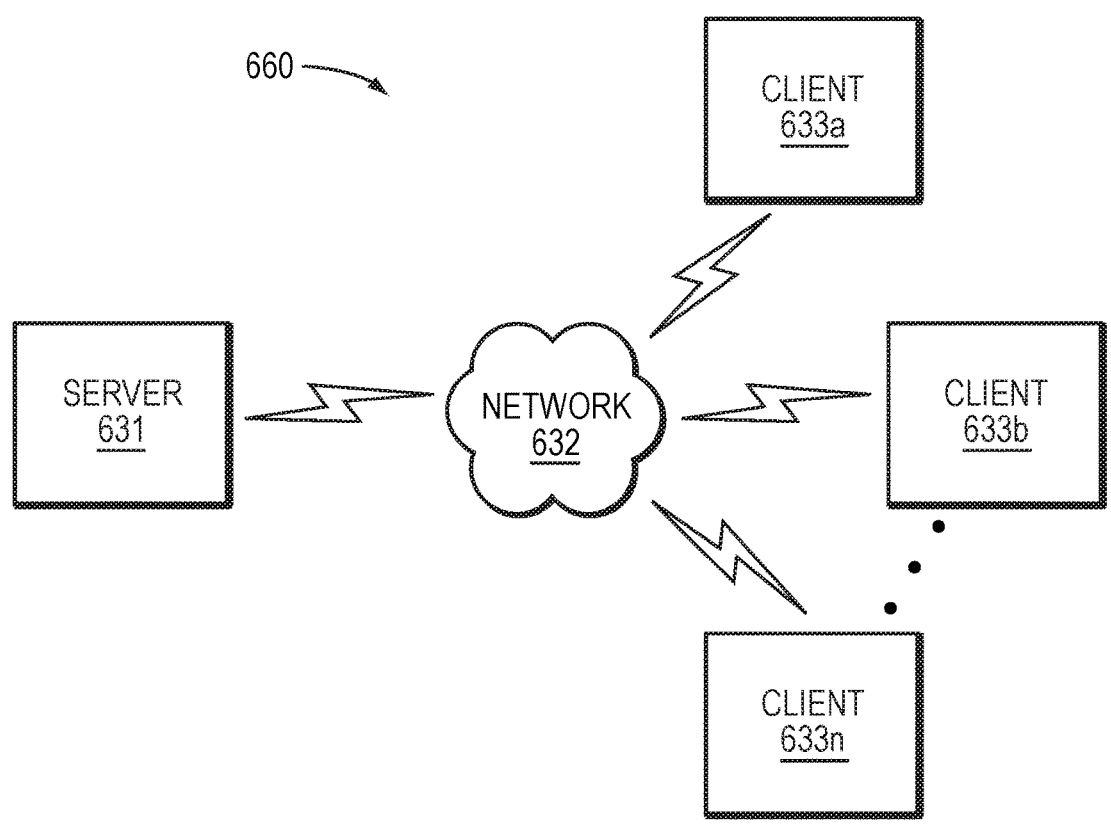
FIG. 6 is a schematic diagram of an example computer network environment in which embodiments of the invention may be implemented.

FIG. 6 illustrates a computer network environment 660 in which an embodiment of the present invention may be implemented. In the computer network environment 660, the server 631 is linked through the communications network 632 to the clients 633a-n. The environment 660 may be used to allow the clients 633a-n, alone or in combination with server 631, to execute any of the modules and/or methods described hereinabove (e.g., modules 105, 115, 140, 207, 225, 230 and/or methods 400 and 402 of FIGS. 1A, 1B, 2, 4A, and 4B, respectively). The environment 660 may comprise the process modeling system 100 (e.g., DMC3) of FIG. 1A, including MPC controller 105 of FIG. 2. It should be understood that the example embodiments described above may be implemented in many different ways. In some instances, the various methods and machines described herein may each be implemented by a physical, virtual, or hybrid general purpose computer, or a computer network environment such as the computer environment 660.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. For example, refineries, manufacturing plants, and other industrial plants are included in the application areas of the present invention. The foregoing description is given with respect to processing plants for simplicity and clarity.

What is claimed is:

1. A computer-implemented method for controlling behavior of an industrial process, the method comprising:
    by a digital processor:
    configuring at least one of optimization preference and optimization priority for each of multiple key manipulated variables of an industrial process at a plant;
    for each of the multiple key manipulated variables, translating the respective at least one of optimization preference and optimization priority into a prioritized economic objective function, such that optimization of the multiple key manipulated variables is defined by multiple prioritized economic objective functions;
    for each of the multiple prioritized economic objective functions, calculating a set of normalized cost factors for use in the respective prioritized economic objective function, wherein the calculating is based on a model gain matrix of manipulated variables and controlled variables of the industrial process;
    in response to the calculating, automatically determining steady-state targets for the multiple key manipulated variables, the determining comprises: (a) solving each of the multiple prioritized economic objective functions in sequence of respective priorities and (b) weighting manipulated variables of a given prioritized economic objective function with the corresponding calculated set of normalized cost factors, the solving being subject to constraints including: (i) controlled variable steady-state targets and (ii) manipulated variable steady-state targets determined from solving higher prioritized economic objective functions; and
    generating control signals based on the determined steady-state targets, and using the generated control signals, adjusting behavior of the industrial process at the plant.

2. The computer-implement method of claim 1, wherein the optimization preference includes one of: maximization, minimization, minimal movement, or no preference.

3. The computer-implemented method of claim 2, wherein the optimization preference of no preference enables configuring of preferred controlled variables constraints.

4. The computer-implemented method of claim 3, wherein the configured preferred controlled variables constraints are used for determining a cost factor for each of the respective multiple key manipulated variables.

5. The computer-implemented method of claim 1, wherein the at least one of optimization preference and optimization priority are based on plant operation goals for the industrial process at the plant.

6. The computer-implemented method of claim 1, wherein a normalized cost factor corresponds to each key manipulated variable and a respective prioritized economic objective function uses the normalized cost factor to weigh the corresponding key manipulated variable to determine economic optimization for the industrial process.

7. The computer-implemented method of claim 1, wherein optimization preference is represented for a key manipulated variable in a prioritized economic objective function by sign of a corresponding cost factor.

8. The computer-implemented method of claim 7, wherein a negative sign of the corresponding cost factor indicates the optimization preference as maximize and a positive sign of the corresponding cost factor indicates the optimization preference as minimize or minimum move.

9. The computer-implemented method of claim 1, wherein adjusting the industrial process at the plant comprises programming physical components of the plant.

10. A computer system for controlling behavior of an industrial process, the system comprising:
    a user interface configured to enable a user to define at least one of an optimization preference and an optimization priority for each of multiple key manipulated variables of an industrial process; and
    at least one processor and associated computer memory, the at least one processor comprising a target optimizer configured to:
    retrieve, from the user interface, the defined at least one of an optimization preference and an optimization priority for each of the set of manipulated variables;
    for each of the multiple key manipulated variables, translate the respective at least one of optimization preference and optimization priority into a prioritized economic objective function, such that optimization of the multiple key manipulated variables is defined by multiple prioritized economic objective functions; and
    for each of the multiple prioritized economic objective functions, calculate a set of normalized cost factors for use in the respective prioritized economic objective function, wherein the calculating is based on a model gain matrix of manipulated variables and controlled variables of the industrial process;
    in response to the calculating, automatically determine steady-state targets for the multiple key manipulated variables, the determining comprises: (a) solving each of the multiple prioritized economic objective functions in sequence of respective priorities and (b) weighting manipulated variables of a given prioritized economic objective function with the corresponding calculated set of normalized cost factors, the solving being subject to constraints including: (i) controlled variable steady-state targets and (ii) manipulated variable steady-state targets determined from solving higher prioritized economic objective functions; and
    generate control signals based on the determined steady-state targets, and using the generated control signals, a control system of the industrial plant adjusting behavior of the industrial process at the plant.

11. The system of claim 10, wherein the optimization preference includes one of:
maximization, minimization, minimal movement, or no preference.

12. The system of claim 11, wherein the optimization preference of no preference enables configuring of preferred controlled variables constraints.

13. The system of claim 12, wherein the configured preferred controlled variables constraints are used for determining a cost factor for each of the respective multiple key manipulated variables.

14. The system of claim 11, wherein the at least one of optimization preference and optimization priority are based on plant operation goals for the industrial process at the plant.

15. The system of claim 10, wherein a normalized cost factor corresponds to each key manipulated variable and a respective prioritized economic objective function uses the normalized cost factor to weigh the corresponding key manipulated variable to determine economic optimization for the industrial process.

16. The system of claim 10, wherein optimization preference is represented for a key manipulated variable in a prioritized economic objective function by sign of a corresponding cost factor.

17. The system of claim 16, wherein a negative sign of the corresponding cost factor indicates the optimization preference as maximize and a positive sign of the corresponding cost factor indicates the optimization preference as minimize or minimum move.

18. The system of claim 10, wherein adjusting the industrial process at the plant comprises programming physical components of the plant.

19. A non-transient computer-readable storage medium having computer-readable code stored thereon, which, when loaded and executed by a computer processor, causes the computer processor to control behavior of an industrial process by:
configuring at least one of optimization preference and optimization priority for each of multiple key manipulated variables of an industrial process at a plant;
for each of the multiple key manipulated variables, translating the respective at least one of optimization preference and optimization priority into a prioritized economic objective function, such that optimization of the multiple key manipulated variables is defined by multiple prioritized economic objective functions;
for each of the multiple prioritized economic objective functions, calculating a set of normalized cost factors for use in the respective prioritized economic objective function, wherein the calculating is based on a model gain matrix of manipulated variables and controlled variables of the industrial process;
in response to the calculating, automatically determining steady-state targets for the multiple key manipulated variables, the determining comprises: (a) solving each of the multiple prioritized economic objective functions in sequence of respective priorities and (b) weighting manipulated variables of a given prioritized economic objective function with the corresponding calculated set of normalized cost factors, the solving being subject to constraints including: (i) controlled variable steady-state targets and (ii) manipulated variable steady-state targets determined from solving higher prioritized economic objective functions; and
generating control signals based on the determined steady-state targets, and using the generated control signals, adjusting behavior of the industrial process at the plant.

* * * * *